May 15, 1951  B. W. BURDINE  2,552,664
ADHESIVE MATERIAL
Filed April 24, 1947

INVENTOR
BERTHA W. BURDINE
BY
*C. W. Marshall*
ATTORNEY

Patented May 15, 1951

2,552,664

UNITED STATES PATENT OFFICE 2,552,664

ADHESIVE MATERIAL

Bertha W. Burdine, New York, N. Y.

Application April 24, 1947, Serial No. 743,569

2 Claims. (Cl. 154—53.5)

This invention relates to adhesive material of the type which is adapted to be interposed between the surfaces of two articles to adhere them together.

Its principal object is to provide an adhesive material which may be handled conveniently without having the material adhere to the fingers and which may be stacked or rolled without adjacent layers adhering together.

Another object is to provide a three-ply laminated material of this character which may be easily applied to and removed from some such articles so that it may be reused.

To these ends I provide a web or sheet with a pressure-sensitive tacky adhesive coating on both of its sides and with outer layers of non-adhesive material permanently affixed to the web provided with openings which form the major portion of such sheets, through which the adhesive material is exposed and may be pressed onto opposite desired surfaces.

A still further object is to stagger the openings in the outer layers so that the solid parts of each of them will register with the openings in the other.

These and other objects of the invention will appear in the following specification, in which I will describe several embodiments of the invention and point out its novel features in claims.

Referring to the drawings,

Figs. 4 and 5 show another modification, of which Fig. 4 is a plan view;

Fig. 5 is a section on an enlarged scale, taken on the line 5—5 of Fig. 4; and

Figure 1:
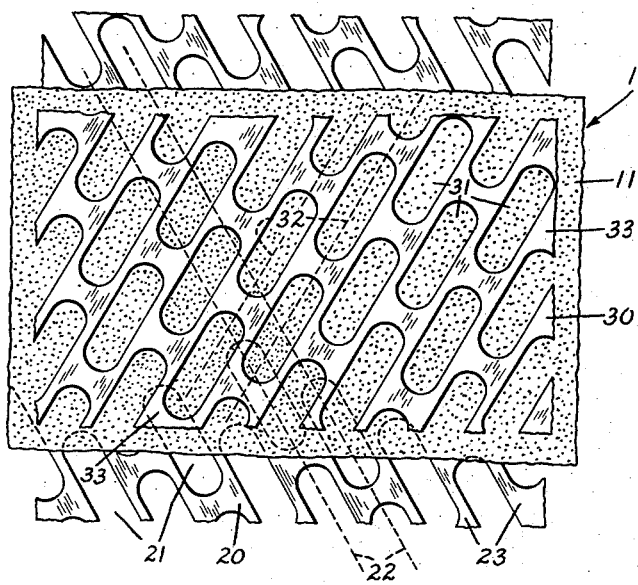
Fig. 1 is a plan view of a sheet of material which is made according to and embodies my invention. In this figure portions of the superimposed layers are shown in different sizes in order to illustrate the construction.

10 designates a thin web or sheet of paper, cloth or other suitable material, both sides of which are coated with a pressure-sensitive tacky adhesive material 11, such, for example, as that shown in Reissue Patent 19,128, R. G. Drew, August 3, 1934.

20 is an outer layer of paper, holland cloth or similar material, which is permanently affixed by the adhesive material 11 to one side of the web 10. It is provided with a plurality of spaced openings 21. These, as shown, are of semi-oval shape, with their major axes on inclined lines 22 and in staggered relation to one another. The area of these openings is considerably greater than that of the solid portions of the sheet between them.

30 is a similar layer of non-adhesive material permanently affixed to the other side of the web 10, with the major axes of its openings 31 on lines 32, which are inclined in the opposite direction to that of the lines 22. The solid portions 33 of the layer 30 are alined with the openings 21 in the layer 20.

It is not necessary for the hands or fingers to come into contact with the tacky adhesive matter in handling material of this construction. These laminated sheets may be stacked or superimposed upon one another without adhering together.

When the material is used to adhere two objects together, it may be placed on a surface of one of the objects and adhered to it by exerting pressure on the solid portions of one of the outer layers immediately over the registering openings in the opposite outer layer, thereby causing the adhesive matter throughout the greater area of the laminated sheet of this new material to be pressed into contact with and be adhered to a desired object so that the material becomes affixed to the object. Then, another object may be placed thereon over the outer layer and be pressed into contact with the adhesive material exposed by the openings in the outer layer so that this second object becomes adhered to the sheet. Thus, the novel material disclosed herein forms a bond between two objects.

Another method of using the material is to interpose it between two objects and to then press them together. This is especially effective when at least one of the objects is flexible.

Figure 2:
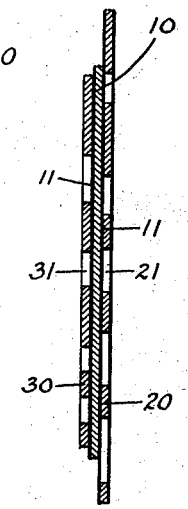
Fig. 2 is an enlarged sectional edge view of a part of the material shown in Fig. 1.

While the material as shown in Figs. 1 and 2 is in the form of laminated sheets of indefinite size, it is to be understood that it may be cut up into strips or into pieces of any desired size and shape, in which the advantage is retained of having minor solid portions of the outer layers by which the severed pieces may be handled with facility, and with openings in such outer layers of such size as to expose the major portion of the adhesive material on opposite sides of the laminated sheet to desired objects.

Figure 3:
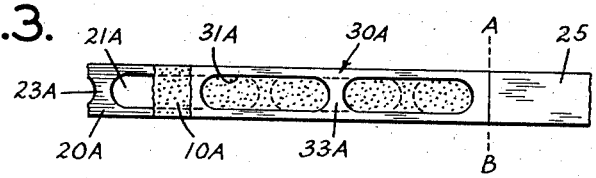
Fig. 3 is a plan view of a modified construction, in which the material is in the form of a strip.

In the form of the material which is illustrated in Fig. 3, the web 10A is in the form of a narrow strip of indefinite length coated on both sides with a pressure-sensitive tacky adhesive. The layer 20A on one side of the web is of the same width as that of the web, and is provided with a series of centrally disposed elongated slots 21A, preferably having rounded ends and separated by narrow solid transverse portions 23A.

The layer 30A on the other side of the web is of similar construction and is provided with centrally disposed elongated slots 31A separated by narrow solid transverse portions 33A. The outer layers are permanently affixed to the web and are relatively so positioned thereon as to bring the solid portions 33A on one side over the center of the slots 21A on the other side.

The web 10A and the layer 30A terminate on a common transverse line A—B, and the other layer, 20A, extends, unslotted, beyond this line, as shown at 25. This is for the definite purpose of making this strip material in such a manner that when it is wound onto a spool or reel or into a roll in the usual manner, with the layer 30A innermost, there will be enough of the unslotted portion 25 of the outer layer 20A to surround and cover the outer convolution of the roll. The layers between each convolution of the roll prevent them from adhering together so that they can be easily unwound.

Figure 4:
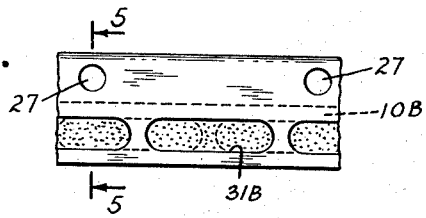
Figure 5:
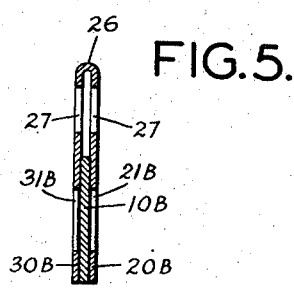

In the modification shown in Figs. 4 and 5, the web 10B is similar to that shown in Fig. 3, but the layers 20B and 30B are made of one piece folded centrally at 26, with their openings 21B, 31B, preferably staggered. In the form shown, the fold 26 is spaced from one edge of the web and the extended portions are provided with spaced perforations 27, 27, for the reception of binder rings or posts. When the material is made in this form, it may be used to interconnect two sheets or pages of a book pressed against opposite sides of the layers 20B, 30B overlapping the web 10B, and the leaves or pages thus connected may be inserted into a suitable binder. The parts of the layers which project laterally from the web provide further areas for facile handling of the material.

Figure 6:
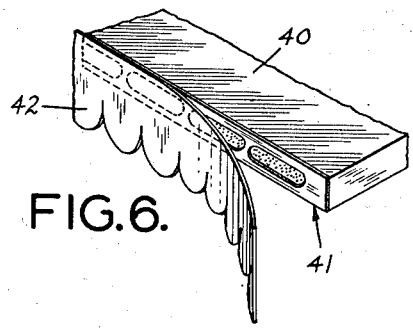
Fig. 6 is a perspective view, illustrating one of the many uses to which this material is applicable.

Another of the many uses to which material of this construction can be placed is shown in Fig. 6. In this figure, 40 designates a shelf, to one edge of which a strip 41 of the material of substantially the same width as the thickness of the shelf has been applied. This is accomplished by exerting pressure on the solid portions of the outer layer of the strip 41, which forces the adhesive through the openings in the inner layer onto the edge of the shelf. 42 is an ornamental edging, which is then placed over the strip 41 and caused to adhere to the strip by pressure applied by a gliding movement of the thumb or a finger. This pressure further increases the adhesion between the strip 41 and the edge of the shelf. Because of the staggered relation of the openings, there is a substantially continuous adhesion between the ornamental edging and the shelf. Thus the operation is extremely simple. It may be reversed. Also, the strip 41 may be removed, rewound and preserved for further use. Thus, there is no part of my material which has to be discarded and wasted, as is the case with former materials.

Various modifications in construction, mode of operation, method and use of an invention may and do occur to others, especially after benefiting from knowledge of such a disclosure as that herein presented of the principles involved, but the invention itself is not confined to the present showing.

I claim:

1. Adhesive material of the type which comprises a flexible web with a continuous coating of pressure-sensitive adhesive material on each of its sides and with outer layers of non-adhesive material over said coatings, in which both of said outer layers are permanently affixed to the web by said coatings and in which both of the outer layers are constructed with parallel elongated spaced slots disposed in staggered relation with solid portions between the sides and ends of the slots, with the slots in each of the outer layers traversing the slots in the other outer layer.

2. Adhesive material of the type which comprises a flexible web in the form of an elongated strip, with pressure-sensitive adhesive material on both of its sides and with outer layers of non-adhesive material of substantially the same width as that of the web over each side of the web, in which both of the outer layers are permanently affixed to the web and are constructed with centrally disposed elongated spaced slots with solid portions between the ends of the slots, through which slots the major part of the adhesive material is exposed, with the solid portions of each of the outer layers in registration with the slots in the other outer layer.

BERTHA W. BURDINE.

REFERENCES CITED

The following references are of record in the file of this patent:

UNITED STATES PATENTS

| Number | Name | Date |
|---|---|---|
| 783,402 | Darby | Feb. 21, 1905 |
| 1,730,066 | Fischer | Oct. 1, 1929 |
| 1,861,663 | Lahey | June 7, 1932 |
| 1,944,834 | Bennett | Jan. 23, 1934 |
| 2,030,135 | Carpenter | Feb. 11, 1936 |
| 2,205,600 | Payzant | June 25, 1940 |
| 2,304,263 | Luty | Dec. 8, 1942 |

FOREIGN PATENTS

| Number | Country | Date |
|---|---|---|
| 345,066 | Great Britain | Mar. 19, 1931 |